United States Patent

Hovind et al.

[11] 4,316,725
[45] Feb. 23, 1982

[54] METHOD AND APPARATUS FOR DEAERATING LIQUID

[75] Inventors: Leif Hovind, Oslo; Tron-Halvard Fladby, Asker, both of Norway

[73] Assignee: A/S Akers Mek. Verksted, Oslo, Norway

[21] Appl. No.: 197,162

[22] Filed: Oct. 15, 1980

[30] Foreign Application Priority Data

Oct. 16, 1979 [NO] Norway .................................. 793332

[51] Int. Cl.$^3$ .............................................. C02B 1/10
[52] U.S. Cl. .......................................... 55/41; 55/55; 55/165; 55/192; 55/194
[58] Field of Search ...................... 55/55, 57, 178, 192, 55/194, 190, 165, 41

[56] References Cited

U.S. PATENT DOCUMENTS

| | | | |
|---|---|---|---|
| 806,696 | 12/1905 | Moody | 55/55 |
| 1,072,670 | 9/1913 | Strite | 55/192 |
| 1,389,101 | 8/1921 | Ohrvall | 55/178 |
| 1,951,809 | 3/1934 | Renfrew | 55/192 |
| 3,616,599 | 11/1971 | Burnham | 55/55 |
| 3,811,247 | 5/1974 | Hurake | 55/178 |

FOREIGN PATENT DOCUMENTS 498799 1/1939 United Kingdom .................... 55/55

Primary Examiner—John Adee
Attorney, Agent, or Firm—Watson, Cole, Grindle & Watson

[57] ABSTRACT

A method for deaerating liquids, especially water, where liquid is introduced into a vacuum zone containing liquid distributing means, and where said liquid after deaeration is conveyed out from said zone is improved in that said water in said vacuum zone is ejected toward at least one vertical impingement surface of a porous material, whereby foaming is counteracted, and is directed via said porous material toward an outlet from said vacuum zone. An apparatus for carrying out said method comprises a casing (1) connected with an evacuation system (16,17,18,19), means (8) for introducing a liquid, e.g. water, into said casing and an outlet (15) for discharging treated liquid, and is characterized in that at least one vertical impingement surface of a porous material (6,11) preventing foaming is provided within said casing (1) as well as means (9) being provided for applying a liquid on the porous surface (6,11).

11 Claims, 1 Drawing Figure

METHOD AND APPARATUS FOR DEAERATING LIQUID

BACKGROUND OF THE INVENTION

1. Field of the Invention

The present invention relates to a method and an apparatus for deaerating liquids, especially water, in order to remove a substantial portion of the oxygen that has been absorbed by the liquid.

2. The Prior Art

It is known to inject water, e.g., seawater into subterranean hydrocarbon-bearing strata in order to displace the hydrocarbons present so as to achieve a better recovery of the hydrocarbon resource.

Injection of seawater containing absorbed oxygen, however, can cause certain disadvantages. The included oxygen will, for example promote corrosion of the utilized piping and, in addition, will, result in an undesired growth of aerobes which are conveyed by the injected water. Growth of aerobionts in the hydrocarbon bearing formation can result in colonies of the microorganisms which will act to seal off the hydrocarbon-bearing stratum, such that the desired recovery thereof cannot be achieved.

Oxygen and other gases can be desorbed or removed from water by boiling the water at atmospheric pressure, but this method is unsuitable for treatment of large quantities of water. Absorbed gases can also be removed by gas stripping, which can be carried out in a gas stripper degasser. Such a gas stripper degasser is usually built as a counter current stripping column containing a packing or perforated trays. Water is introduced at the top of the degasser and the stripping gas, e.g., purified natural gas, is introduced at the bottom of the column and bubbles up through the water in intimate contact therewith, the stripping gas displacing other absorbed gases, so that water at least partly freed from, e.g., oxygen is obtained.

Gas-stripping, however, has certain disadvantages, i.e., the utilized equipment is expensive, heavy and bulky, which is most disadvantageous on an offshore rig where it occupies space and represents an undesired weight.

A large amount of natural gas that is poor in sulphur is consumed and must be burned after use; and there is a gas hazard in the area around such a plant which results in restrictions as to the positioning of the plant as well as necessitating various safety measures.

Because the amount of absorbed gas in a liquid is proportional to the partial pressure of the gas above the liquid, absorbed gases can also be removed by reducing the partial pressure of the gas above the liquid. For this purpose, vacuum deaerators of a conventional kind, being constructed similar to the gas stripping degassers, can be used, but instead of introducing gas at the bottom, the upper part of the deaerator is preferably connected to a suitable vacuum pump for reduction of the partial gas pressure. In connection with the conventional vacuum deaerators, the desired effect necessitates a multi-stage deaerator. Such a vacuum deaerator is, thus, as heavy and as bulky as a gas-stripper degasser. Also, in the final step it is often necessary to add oxygen-consuming chemicals to achieve acceptable low oxygen values. An addition of chemicals requires further expensive dosing and control equipment and the cost of chemicals will further increase overheads.

The known technology of the art has been described by Dr. Charles C. Patton in "Oilfield Water Systems" (Petro Tech Ltd. 1977). The mentioned paper contains a description of today's equipment and methods as well as a copious list of references to further literature.

The present invention relates to an improved method and apparatus for vacuum deaerating of liquids, especially water, permitting one-step deaeration which results in very low values of residual free oxygen in the treated water. The improved method also permits use of substantially less bulky equipment than the known methods.

SUMMARY OF THE INVENTION

According to the present method, water to be treated is injected into a vacuum zone to impinge on one or several surfaces covered by a "foam killing" porous material which the atomized water penetrates, to then flow down through the material into a second zone, where deaerated water is maintained at the relatively constant level. Within said vacuum zone a lowest possible vacuum, preferably approximately corresponding to the vapor pressure of water, is maintained. In order to prevent the introduced water from impinging on the water in the subjacent zone, a permeable partition is provided between the water and the upper zone. The permeable partition can be made from the same material as the material upon which the water impinges during injection.

There are several known devices and methods for separating gas from a liquid. Thus, U.S. Pat. No. 3,631,654, although not disclosing a vacuum deaerator, discloses an apparatus for separating a mechanical mixture of gases and liquids. A filter is wetted by liquid and only the liquid is passed through the filter due to the pressure differential. Another portion of the same filter repels the liquid and lets the gas pass to a separate outlet.

U.S. Pat. No. 3,523,408 discloses an apparatus capable of separating gas and liquid and is based on the same principle of separation as U.S. Pat. No. 3,631,654.

U.S. Pat. No. 4,039,305 discloses a filter which separates gas bubbles from oil. The mixture is urged through a filter material where the oil and gas phases are separated.

U.K. Pat. No. 1,298,920 discloses a vacuum deaerator (-degasser). An object of the device is to provide a large area of contact between the liquid inside the vacuum tank and the vacuum. This is achieved by urging the liquid out through filter elements within the tank.

U.K. Patent Application No. 2,013,520 discloses an apparatus that may be, but is not necessarily, a vacuum degasser. It is an object of the invention disclosed in the application to separate gas from a foaming medium. Gas is drawn off the upper portion of a vessel through filter elements, which elements do not pass foam.

BRD Patent Application No. 2,645,561 does not disclose a vacuum deaerator (-degasser) which removes dissolved gases from a liquid, but an apparatus for separating undissolved gases and foreign matter from a liquid. Such a device is often suitable in front of a pump.

U.K. Pat. No. 1,323,957 discloses features that have certain points of resemblance with the object of the present invention. This U.K. Specification shows a two-stage apparatus where a first deaeration or degassing is carried out in a first zone, whereafter the preliminarily treated liquid is delivered to a further stage of treatment of a corresponding nature. It is obvious that the preliminary stage is not sufficient to provide the desired gas level, and it is necessary to heat the liquid before it is subjected to the second stage. This represents an expensive method involving the use of heat.

According to the last mentioned U.K. Specification liquid is sprayed onto or toward a horizontally arranged porous material, e.g. Raschig rings.

According to the present invention the liquid to be treated is injected by the aid of one or several nozzles toward vertically arranged surfaces that are coated with a porous material which counteracts the formation of foam. Some of the liquid will of course penetrate the porous material and migrate through it, but the bulk of the liquid will flow down along the surface of the porous material, so that a possible filter effect will be quite limited.

As will appear from experimental data shown below, substantially improved deaeration is achieved by the present method as compared with those known in the art. It is assumed that when, e.g., water, is injected into a deaerator where the vacuum zone is maintained at a very low pressure, the absorbed gases can form "boiling nuclei", around which vapor or lager vapor bubbles are formed and are immediately liberated from the ejected water before or after impingement on the porous material. It is, furthermore, assumed that the poorer efficiency of conventional packed vacuum degassers is due to the formation of foam and gas bubbles on the surface of the present water. Due to the surface tension of water, the partial pressure of the oxygen within a bubble will be higher than the partial pressure outside the bubble, and as a result the oxygen content of water in contact with such a bubble will be higher than the total pressure within the column would imply. It is assumed that the poorer efficiency of a conventional vacuum degasser is due to bubble and foam formation during the movement of water downward through the packing of the column and that the foam formation sets bounds to the efficiency of degassers of such a kind.

For carrying out the method according to the present invention an apparatus is provided which comprises at least one vacuum zone into which water is injected and at least one subjacent zone for collecting and drawing off deaerated water. Within the first zone at least one impingement surface of a "foam killing" porous material is provided against which water is injected by one or more suitable nozzles.

The first and second zones are separated by a permeable partition comprising a porous material, e.g., the same material as that used on the impingement wall which the injected water strikes.

The object of the partition between the water in the subjacent zone and the zone where water is introduced is partly to prevent foaming and partly to prevent direct contact between water from the nozzles and the treated water, which otherwise would reduce the efficiency of the apparatus. The level of the treated water is preferably adjusted in such a manner that the water surface is maintained inside the porous partition separating the two zones.

The zones are provided in a suitable casing which can be put under the necessary vacuum. The casing is preferably insulated to prevent undesired condensation on the outside casing surface.

DESCRIPTION OF THE DRAWING

A preferred embodiment of an apparatus is shown in the accompanying FIGURE, which shows a schematic side view thereof.

DETAILED DESCRIPTION OF THE PREFERRED EMBODIMENT

Figure 1:
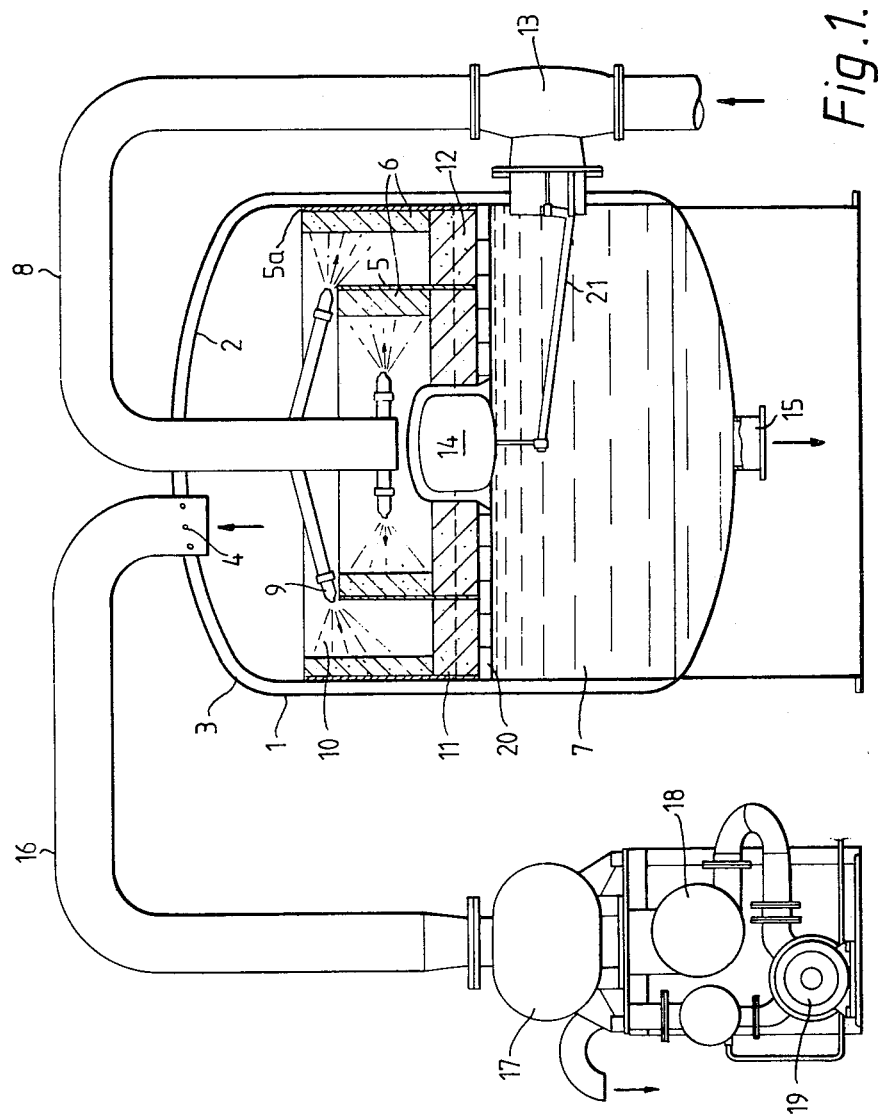

As shown in the FIGURE, the apparatus includes a sealed exterior tank, constructed in such a manner that it can be put under a necessary vacuum. Inside said tank 1 an interior shell 2 is provided to prevent water from contact with the exterior tank wall, at least in the upper portion of the tank 1. The space 3 formed between the shell 2 and the tank 1 is vented at 4 to the suction side of, e.g., a "ROOTS" blower 17 via the piping 16. As a consequence, the space 3 will be under a vacuum and, thus, has a heat insulating effect which renders further insulation unnecessary.

Inside the shell 2 one or more concentric vertically-extending walls 5 and 5a are provided. These walls are coated by a porous material 6, e.g., glass wool or a textile made from natural or artificial fibres or the like, having a thickness of, e.g., 50–100 mm. These walls 5 and 5a extend down to and through coating 11 of a horizontally extending porous material that covers the bath 7. Coating 11 and the concentric walls 5 and 5a rest on a perforated sheet 20 or the like. Water is introduced via control valve 13 and pipe 8 through nozzles 9 with sufficient pressure to ensure good distribution, approximately 0.5–0.7 bar for a 15 mm full-jet nozzle. From nozzles 9 water is ejected toward the porous material 6 on walls 5 and 5a. Coating 11 will prevent water having a relatively high velocity from contact with the treated water in the bath 7. Thus, oxygen-containing water will not come into direct contact with treated water. Experiments have shown that unless there is a coating 11, it is difficult to achieve a residual oxygen content of less than 0.40 ppm in a one-stage vacuum deaerator at a water temperature of 10°–20° C.

In coating 6 the water is decelerated and further distributed without any foaming and it flows through coating 6 and possibly along walls 5 and 5a down into bath 7. Due to the fact that water from nozzles 9 is prevented from direct contact with the water in bath 7 and that it flows down into the bath through the porous coating, desorbed gases cannot be carried along with the water to be introduced into the bath again. Because the water surface of bath 7 is in contact with the porous coating, foaming on the water surface is avoided. The surface of bath 7 is preferably maintained within coating 11 as indicated at 12. This is achieved by the aid of a control valve 13 operated by stay 21 which is connected with float 14. Water is sucked out from the deaerator through outlet 15. Sucked off gas and vapor is sucked off at the top of the deaerator through pipe 16 by a suitable vacuum pump, e.g., a ROOTS blower 17. From the ROOTS blower the drawn off gas/vapor can be condensed in injection cooler 18 by the introduction of cold water. The volume that liquid ring pump 19 has to pump is, thus, much reduced. Water that is mixed into injection cooler 18 and the obtained condensate can be utilized to replenish the liquid ring pump, which is, thus, replenished automatically.

A comparison between a conventional seawater deaerator operating according to the vacuum principle and the above-described deaerator shows that the method and apparatus according to the present invention have substantial advantages. For a capacity of 340 m³ water/h, the following dimensions and efficiencies are typical.

CONVENTIONAL APPARATUS

Diameter 3 m
Height 10 m
Efficiency 0.05 ppm residual $O_2$ at 30° C. and 0.10 ppm residual $O_2$ at 20° C.

APPARATUS ACCORDING TO THE INVENTION

Diameter 1.5 m
Height 3.9 m
Efficiency 0.015 (0.015 was the lower limit of the measuring device used) ppm residual $O_2$ at 13° C.

As apparent from the shown results, substantially improved removal of oxygen is achieved by the deaerator according to the invention as compared to conventional means. With the last-mentioned apparatus, the residual $O_2$ content was 7 times higher at 20° C. than the findings with the present deaerator in spite of the fact that the present deaerator was tested at a water temperature of 13° C., which additionally emphasizes the advantages of the present method apparatus.

The volume of the conventional apparatus is about 10 times larger than that of the present apparatus, which means considerable reductions as regards weight and bulk.

Although the apparatus shown in the accompanying drawing is provided with one absorbing coating 6 on wall 5, it is feasible to cover the opposite surface of wall 5 with a corresponding coating and arrange the nozzles in such a manner that the last-mentioned coating is also sprayed by the introduced water.

We claim:

1. A method for deaerating liquids which comprises
 (a) directing at least one stream of liquid to be deaerated into a vacuum zone and against the surface of a porous material which is coated on at least one vertically-extending impingement wall, the porous material preventing the foaming of the liquid in the streams,
 (b) causing the liquid absorbed in the porous material on each vertically-extending impingement wall to flow downwardly through the porous material and concurrently become deaerated,
 (c) causing the deaerated liquid to pass from the bottom of the porous material coated on each vertically-extending impingement wall downwardly into a horizontally-extending porous partition, the partition acting to prevent any liquid from the streams in step (a) from passing directly therebelow,
 (d) causing the deaerated liquid to pass downwardly through the horizontally-extending porous partition and flow into a bath of deaerated liquid,
 (e) withdrawing deaerated liquid from the bath of deaerated liquid, and
 (f) controlling the amount of liquid in the streams of step (a) such that the surface of the bath of deaerated liquid will be located in the horizontally-extending porous partition, thereby preventing the occurrence of foam on the surface of the bath.

2. The method as defined in claim 1 wherein each stream of liquid in step (a) is composed of water which contains dissolved air, and wherein the bath of deaerated liquid is composed of deaerated water.

3. The method as defined in claim 1 wherein each vertically-extending impingement wall is annular in shape, wherein the porous material coated on each impingement wall is located on the inner side thereof, and wherein multiple streams of liquid are directed radially outwardly towards different portions of the porous material coated on each impingment wall.

4. An apparatus for deaerating liquids which comprises
 a casing,
 a horizontally-extending partition formed of a porous material positioned within the casing to divide it into an upper chamber and a lower chamber,
 at least one vertically-extending impingement wall extending into the upper chamber from the horizontally-extending partition, each impingement wall having a coating of a porous material which extends downwardly to contact the porous material of the horizontally extending porous partition,
 at least one liquid discharge means located in the upper chamber to direct a stream of liquid to be deaerated towards a coating of porous material on an impingement wall,
 pump means connected to the casing to create a vacuum in the upper chamber, and
 drainage means connected to the casing to remove deaerated liquid which accumulates as a bath in the lower chamber.

5. An apparatus as defined in claim 4 wherein each vertically-extending impingement wall is annular in shape and the porous material is coated on the inner surface of each annularly-shaped impingement wall.

6. An apparatus as defined in claim 4 wherein each liquid discharge means is supplied with liquid to be deaerated from a common pipe, wherein a flow control means is located in said common pipe, and wherein a float means is located in the lower chamber and is connected to said flow control means to maintain the surface of bath of deaerated liquid in the casing such that its surface is located within the horizontally-extending partition.

7. An apparatus as defined in claim 4 wherein the porous material on each vertically-extending impingement wall is composed of natural or artificial fibers woven as a textile.

8. An apparatus as defined in claim 4 wherein a perforated support sheet extends across the casing to support the horizontally-extending partition.

9. An apparatus as defined in claim 8 wherein each vertically-extending impingement wall is mounted on the perforated support sheet.

10. An apparatus as defined in claim 4 wherein the casing includes an outer shell and an inner shell and wherein means are provided to connect the space between the outer shell and the inner shell to the pump means to create a vacuum therein.

11. An apparatus as defined in claim 10 wherein each vertically-extending impingement wall is annular in shape and the porous material is coated on the inner surface of each annularly-shaped impingement wall, and wherein one impingement wall is positioned adjacent the inner shell of the casing.

* * * * *